(12) United States Patent
Morishita et al.

(10) Patent No.: US 10,454,920 B2
(45) Date of Patent: Oct. 22, 2019

(54) NON-TRANSITORY COMPUTER-READABLE RECORDING MEDIUM, CONNECTION MANAGEMENT METHOD, AND CONNECTION MANAGEMENT DEVICE

(71) Applicant: FUJITSU LIMITED, Kawasaki-shi, Kanagawa (JP)

(72) Inventors: Ryohei Morishita, Yokohama (JP); Kan Yamamoto, Numazu (JP); Yuriko Koseki, Kawasaki (JP); Yoshie Nehashi, Shizuoka (JP); Norie Tachibana, Kawasaki (JP); Hiroyoshi Kasai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 15/663,911

(22) Filed: Jul. 31, 2017

(65) Prior Publication Data
US 2018/0041497 A1   Feb. 8, 2018

(30) Foreign Application Priority Data
Aug. 3, 2016   (JP) ................................. 2016-152492

(51) Int. Cl.
*H04L 29/06* (2006.01)
*H04L 29/08* (2006.01)

(52) U.S. Cl.
CPC ........ *H04L 63/0823* (2013.01); *H04L 63/083* (2013.01); *H04L 67/10* (2013.01); *H04L 67/141* (2013.01); *H04L 67/146* (2013.01)

(58) Field of Classification Search
CPC ... H04L 63/0823; H04L 63/083; H04L 67/10; H04L 67/146; H04L 67/141
See application file for complete search history.

(56) References Cited

U.S. PATENT DOCUMENTS

| 10,009,337 B1* | 6/2018 | Fischer | H04L 63/105 |
| 2010/0281522 A1* | 11/2010 | Hatakeyama | G06F 21/33 726/4 |
| 2011/0004753 A1* | 1/2011 | Gomi | H04L 63/0807 713/156 |

(Continued)

FOREIGN PATENT DOCUMENTS

| JP | 2013-041552 | 2/2013 |
| JP | 2014-157480 | 8/2014 |
| JP | 2015-125510 | 7/2015 |

*Primary Examiner* — Darren B Schwartz
(74) *Attorney, Agent, or Firm* — Fujitsu Patent Center

(57) ABSTRACT

A non-transitory computer-readable recoding medium having stored therein a connection management program that causes a computer to execute a process that includes receiving registrations of a plurality of certificates, the plurality of certificates respectively being used to establish connections to a plurality of external systems, respectively, the plurality of external systems respectively relating to a plurality of tenants, respectively, whose connections are managed by the computer, and establishing a connection to a specific external system using a specific certificate when a information processing terminal associated with a specific tenant is connecting to the specific external system, the specific certificate corresponding both to the specific tenant and the specific external system, the specific external system being included in the plurality of external systems.

8 Claims, 12 Drawing Sheets

AUTHENTICATION INFORMATION MANAGEMENT TABLE

| AUTHENTICATION TOKEN | TENANT ID | TENANT INFORMATION |
|---|---|---|
| abcde12345 | A | tenant A |
| fghij67890 | B | tenant B |

DESTINATION INFORMATION MANAGEMENT TABLE

| TENANT ID | DESTINATION INFORMATION | URL |
|---|---|---|
| A | back-end A | https://aaa.example.com |
| B | back-end B | https://bbb.example.com |

CERTIFICATE MANAGEMENT TABLE

| TENANT ID | CERTIFICATE |
|---|---|
| A | XXX |
| B | YYY |

(56) References Cited

U.S. PATENT DOCUMENTS

| | | | |
|---|---|---|---|
| 2012/0072716 A1* | 3/2012 | Hu | G06F 21/602 |
| | | | 713/156 |
| 2013/0044343 A1 | 2/2013 | Matsugashita | |
| 2013/0117558 A1* | 5/2013 | Metke | G06F 21/33 |
| | | | 713/156 |
| 2014/0215590 A1* | 7/2014 | Brand | H04L 67/1097 |
| | | | 726/6 |
| 2014/0237580 A1 | 8/2014 | Kato | |
| 2014/0304837 A1* | 10/2014 | Mogaki | G06F 21/33 |
| | | | 726/28 |
| 2014/0380429 A1* | 12/2014 | Matsugashita | H04L 63/0823 |
| | | | 726/4 |
| 2015/0106903 A1* | 4/2015 | Mihara | H04L 63/0823 |
| | | | 726/8 |
| 2015/0156193 A1* | 6/2015 | Chen | H04L 63/0823 |
| | | | 713/156 |
| 2015/0180863 A1* | 6/2015 | Kobayashi | H04L 47/70 |
| | | | 726/9 |
| 2015/0193600 A1* | 7/2015 | Matsuda | H04L 63/0823 |
| | | | 726/9 |
| 2015/0220917 A1* | 8/2015 | Aabye | H04L 9/3268 |
| | | | 705/64 |
| 2017/0171201 A1* | 6/2017 | Matsugashita | G06F 21/6245 |
| 2017/0373860 A1* | 12/2017 | Kshirsagar | H04L 9/3268 |
| 2018/0213398 A1* | 7/2018 | Sharif | H04W 12/06 |
| 2018/0337915 A1* | 11/2018 | Tewari | H04L 63/0823 |

\* cited by examiner

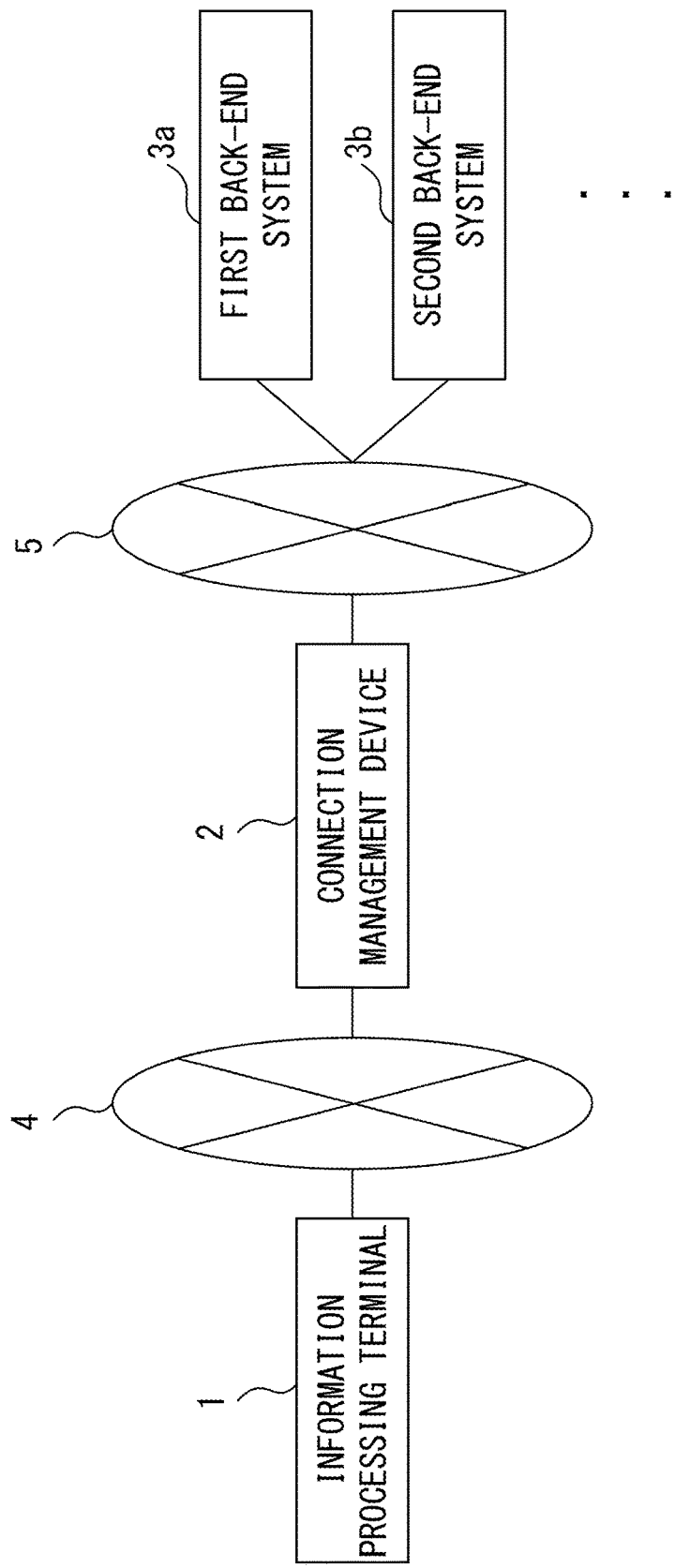
F I G. 1

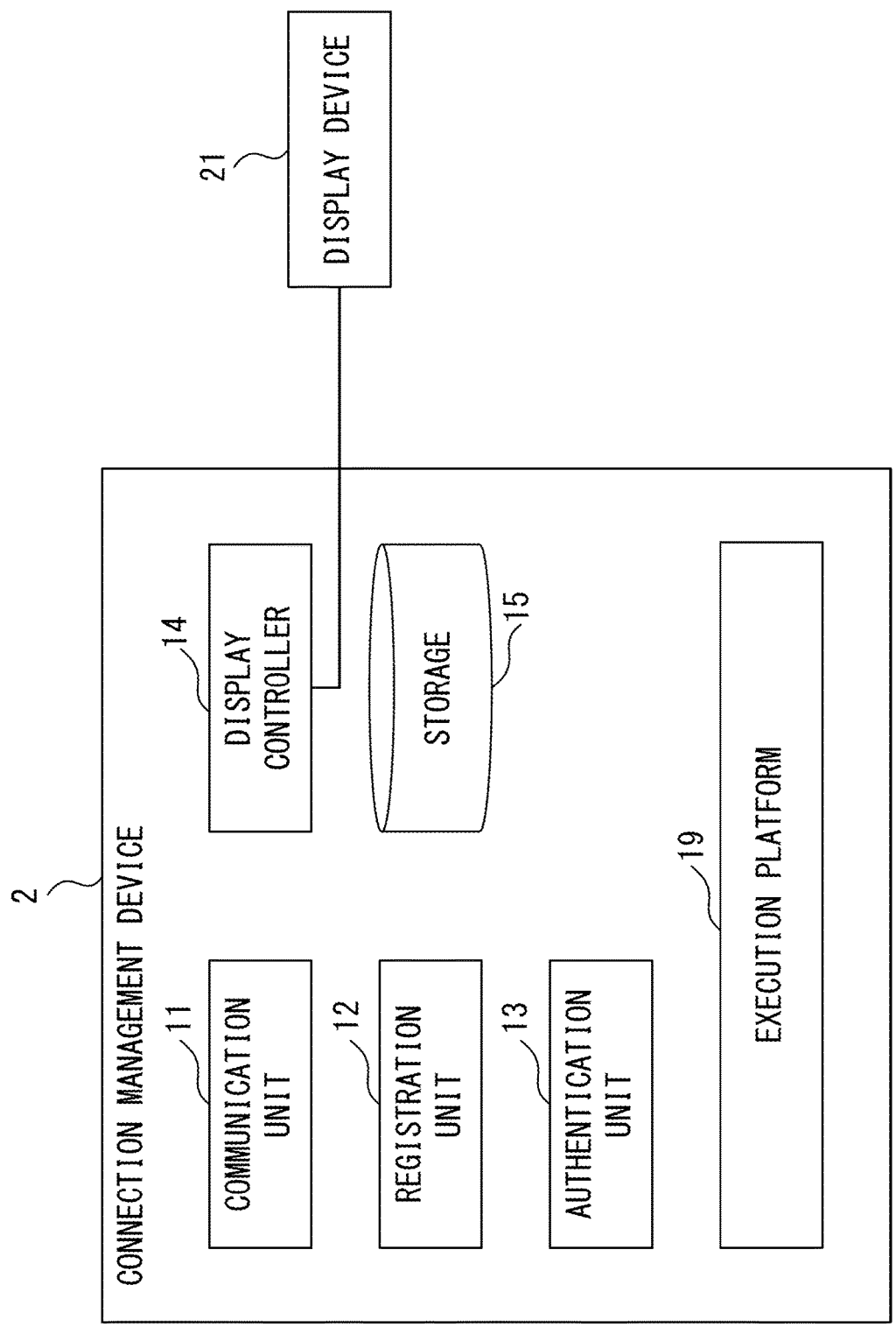
F I G. 2

AUTHENTICATION INFORMATION MANAGEMENT TABLE

| AUTHENTICATION TOKEN | TENANT ID | TENANT INFORMATION |
|---|---|---|
| abcde12345 | A | tenant A |
| fghij67890 | B | tenant B |

DESTINATION INFORMATION MANAGEMENT TABLE

| TENANT ID | DESTINATION INFORMATION | URL |
|---|---|---|
| A | back-end A | https://aaa.example.com |
| B | back-end B | https://bbb.example.com |

CERTIFICATE MANAGEMENT TABLE

| TENANT ID | CERTIFICATE |
|---|---|
| A | XXX |
| B | YYY |

F I G. 3

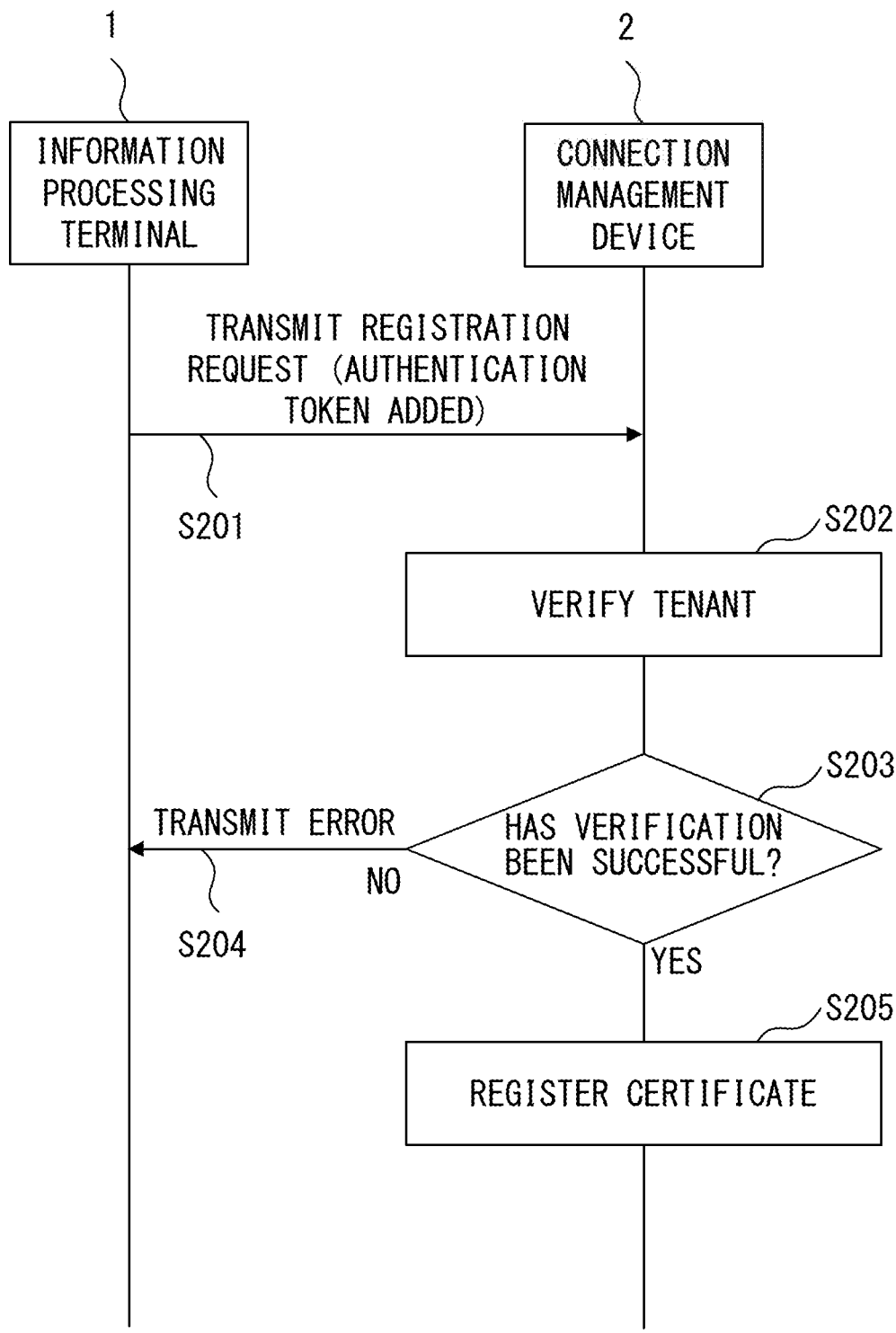
F I G. 4

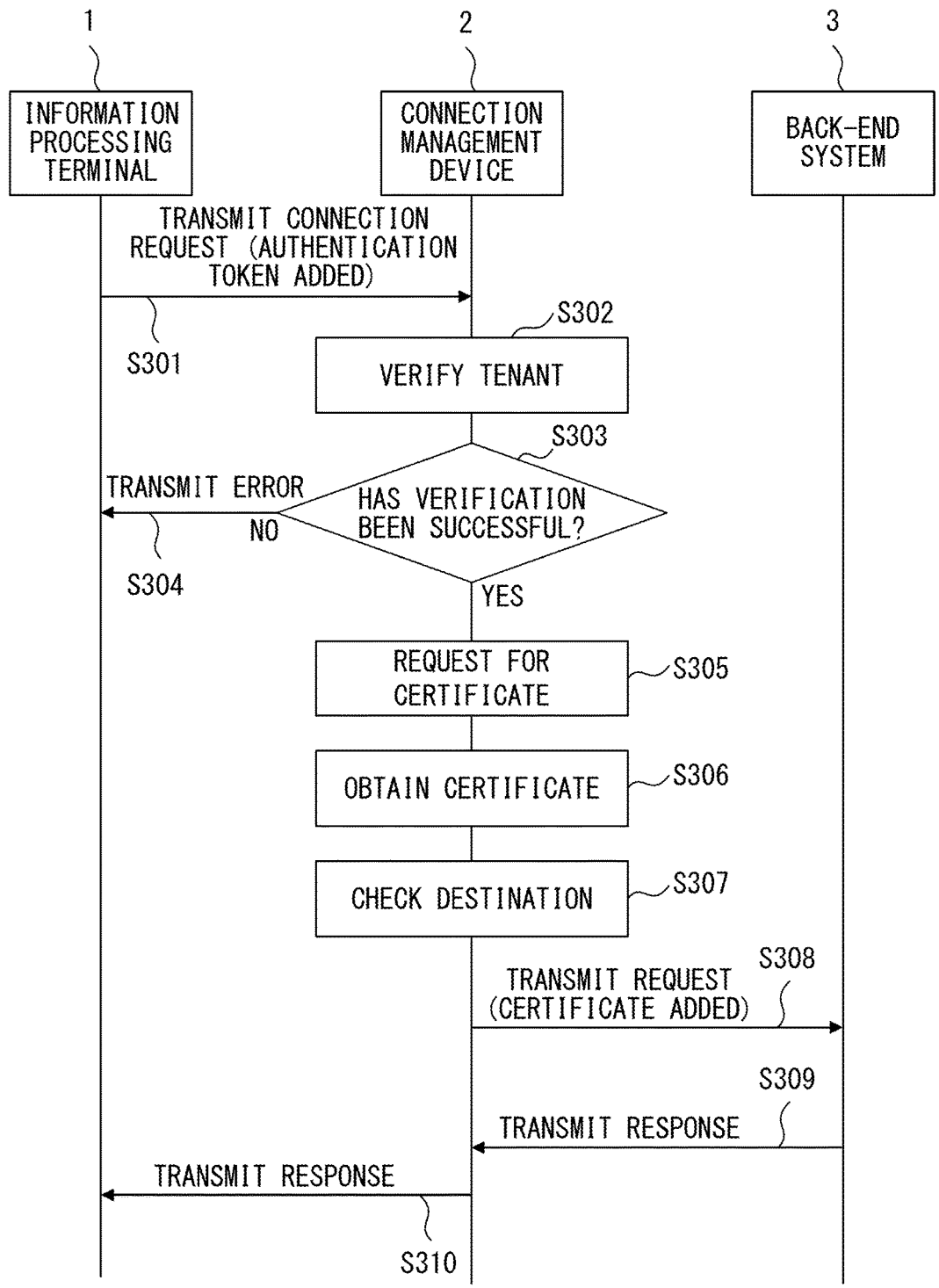
F I G. 5

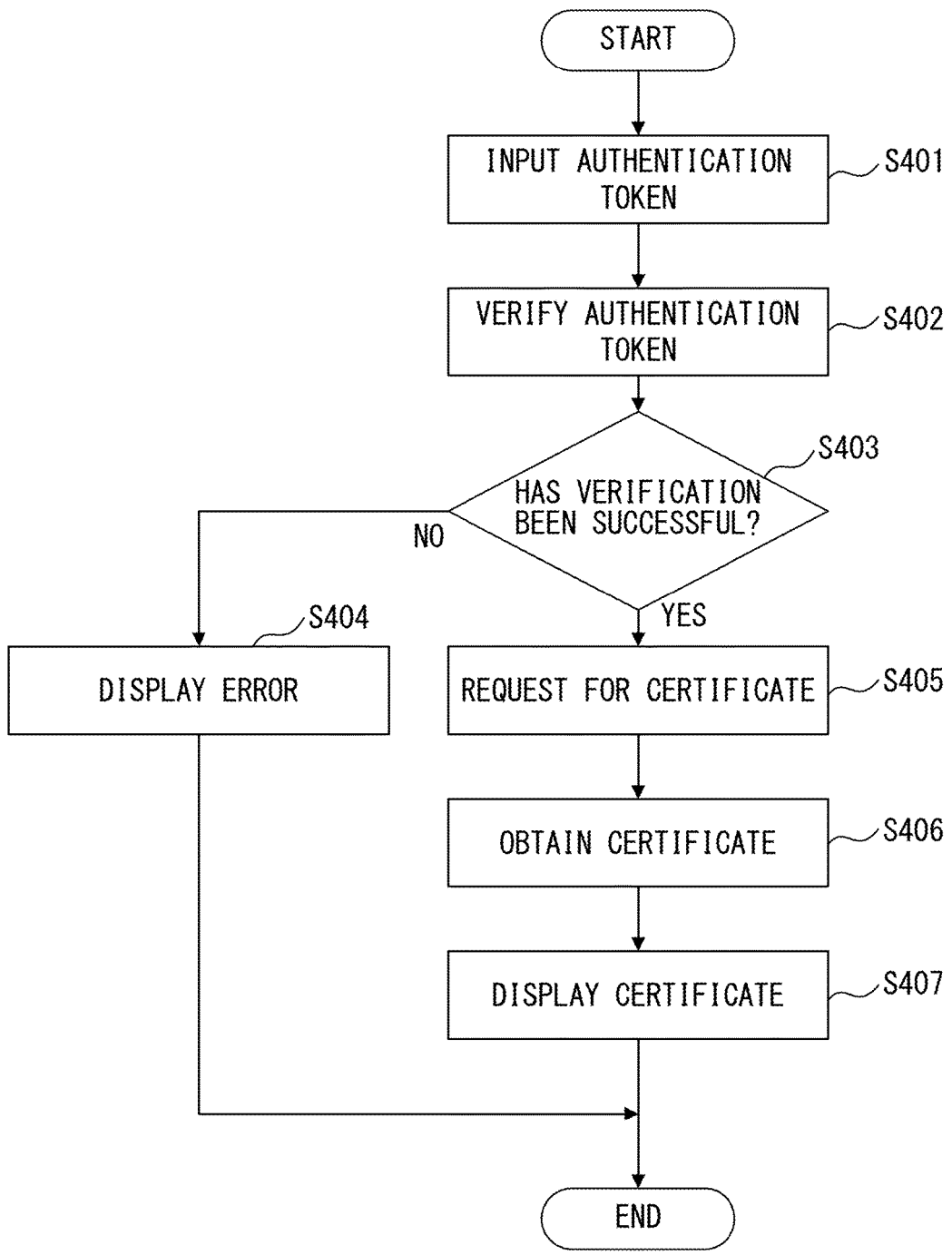
F I G. 6

AUTHENTICATION INFORMATION MANAGEMENT TABLE

| AUTHENTICATION TOKEN | TENANT ID | TENANT INFORMATION | CERTIFICATE |
|---|---|---|---|
| abcde12345 | A | tenant A | storage 15a |
| fghij67890 | B | tenant B | storage 15b |

DESTINATION INFORMATION MANAGEMENT TABLE

| TENANT ID | DESTINATION INFORMATION | URL |
|---|---|---|
| A | back-end A | https://aaa.example.com |
| B | back-end B | https://bbb.example.com |

F I G. 8

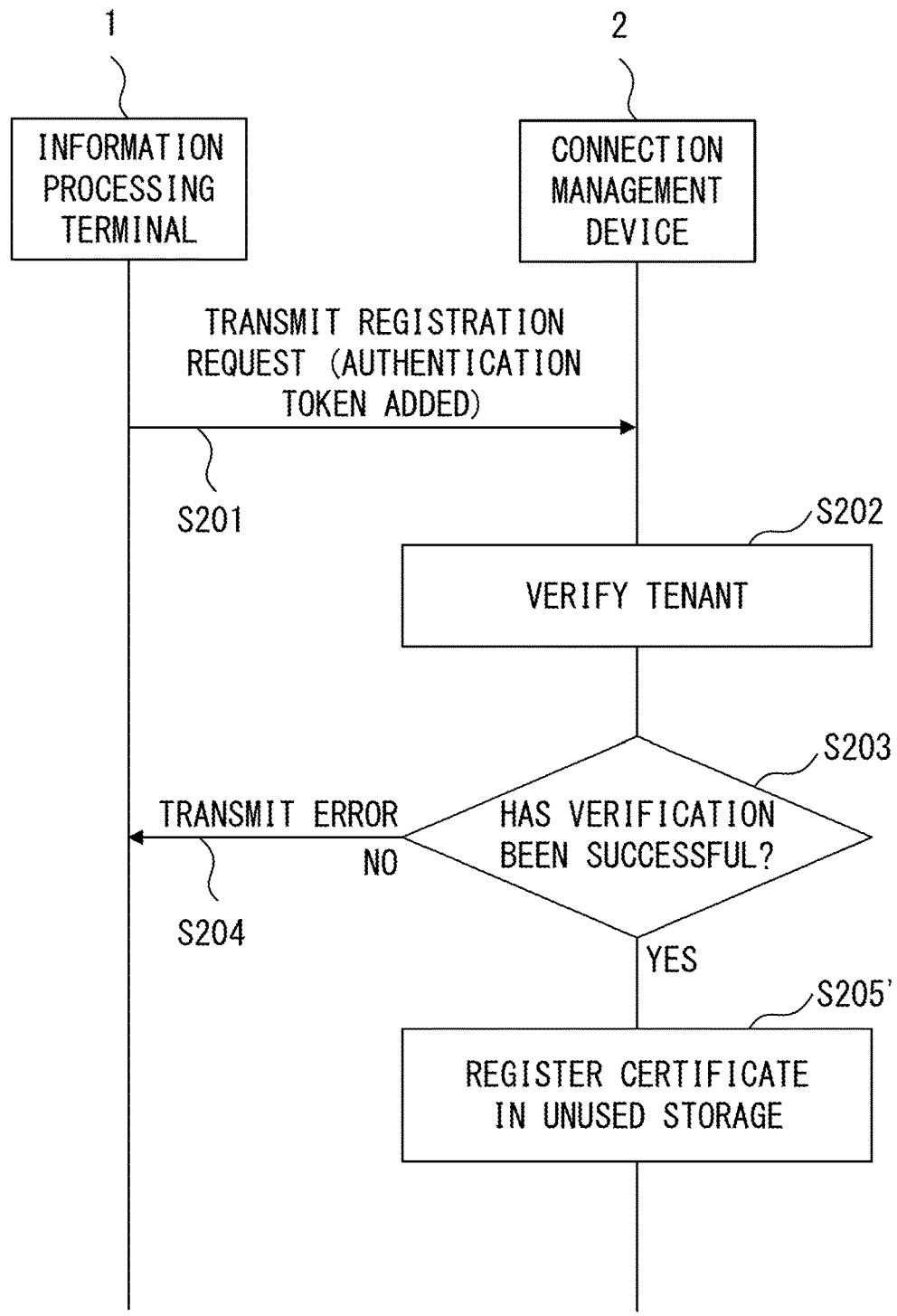
F I G. 9

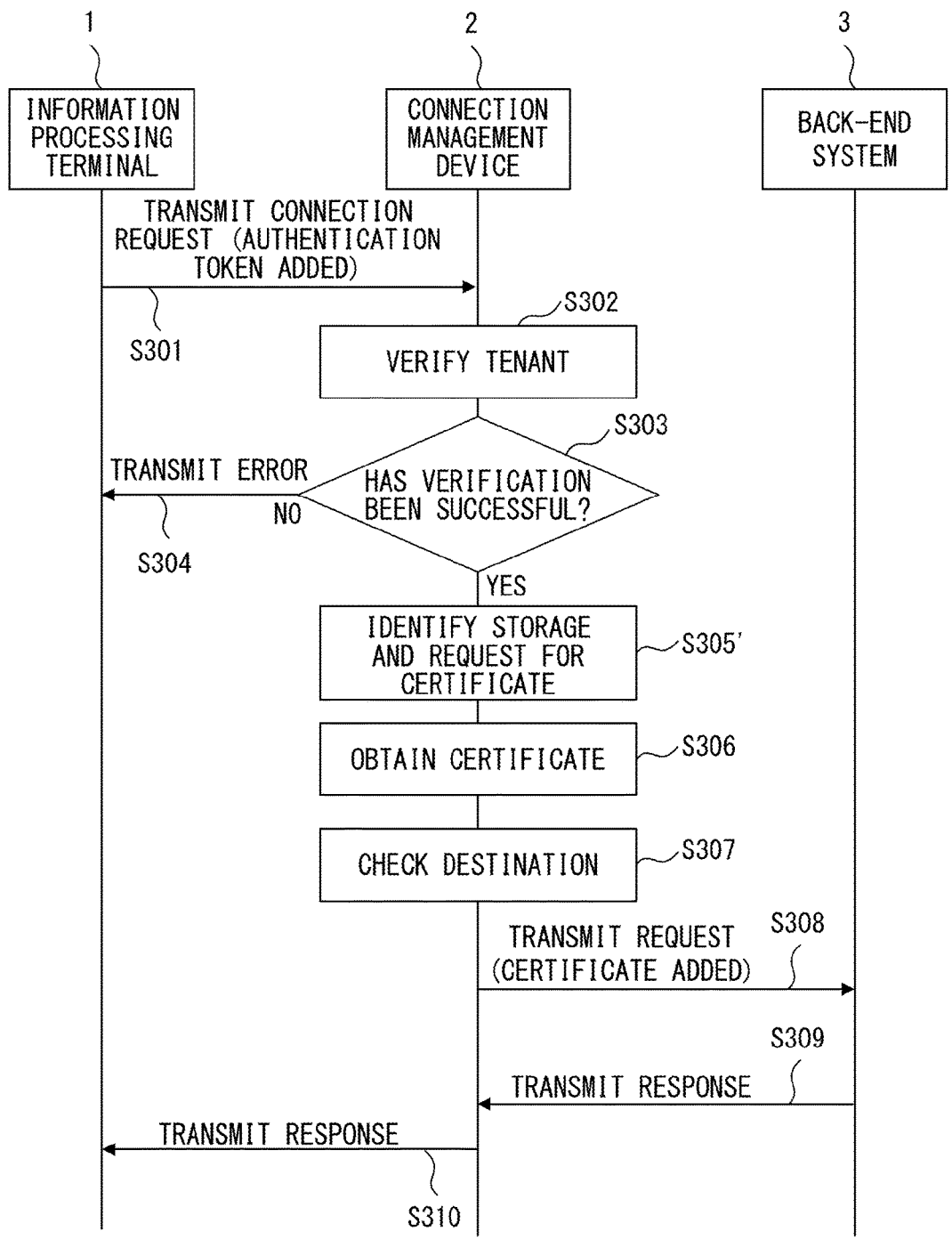
F I G. 1 0

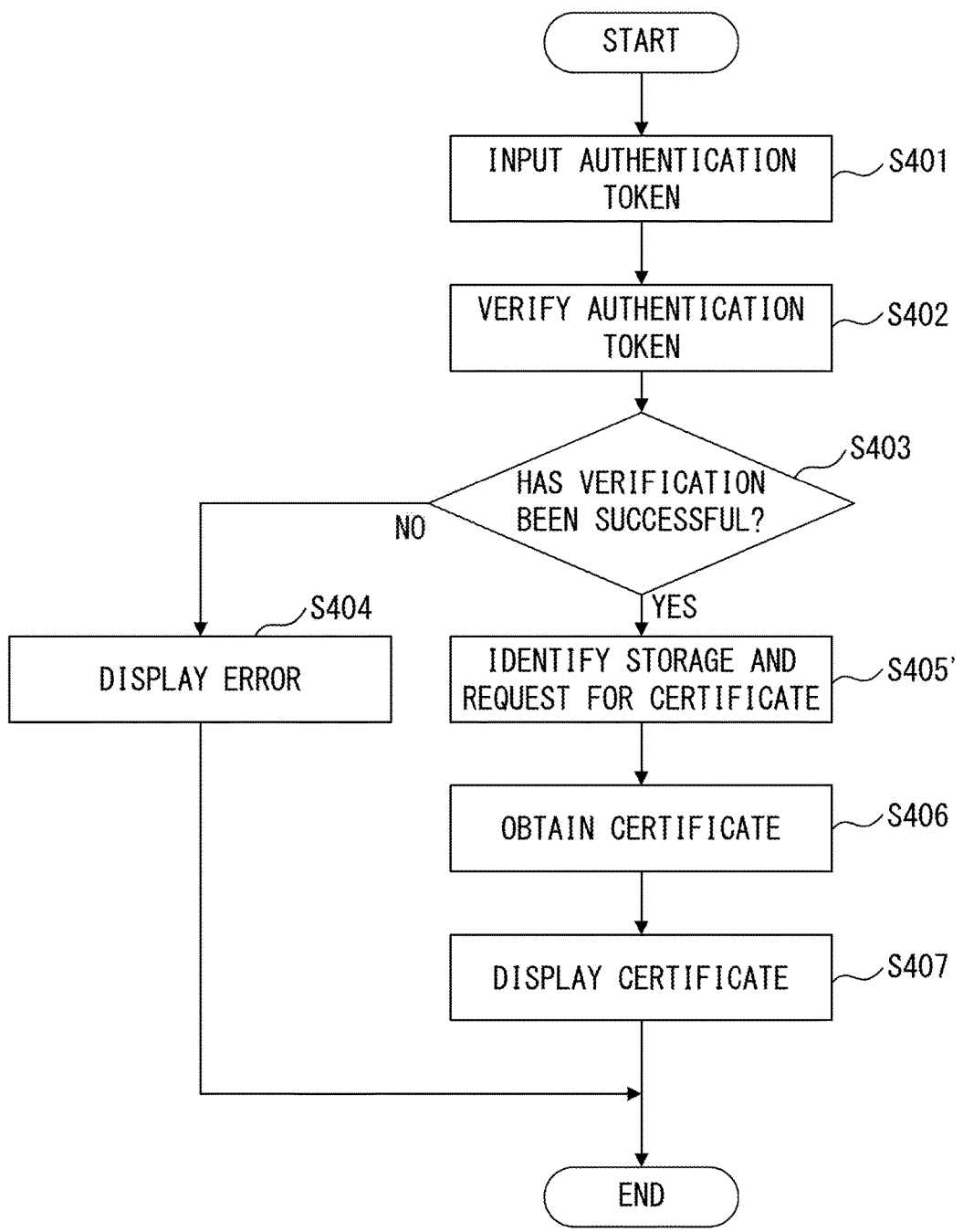
F I G. 1 1

NON-TRANSITORY COMPUTER-READABLE RECORDING MEDIUM, CONNECTION MANAGEMENT METHOD, AND CONNECTION MANAGEMENT DEVICE

CROSS-REFERENCE TO RELATED APPLICATION

This application is based upon and claims the benefit of priority of the prior Japanese Patent Application No. 2016-152492, filed on Aug. 3, 2016, the entire contents of which are incorporated herein by reference.

FIELD

The embodiments discussed herein are related to a non-transitory computer-readable recording medium, a connection management device, and a connection management method.

BACKGROUND

A technology is used that connects a tenant that uses cloud services to a back-end system provided for each tenant through a cloud system. The connection to the back-end system is established by performing authentication by use of a certificate, using, for example, an execution platform such as a platform as a service (PaaS) that is used when cloud services are provided.

Patent Document 1: Japanese Laid-open Patent Publication No. 2014-157480
Patent Document 2: Japanese Laid-open Patent Publication No. 2013-41552
Patent Document 3: Japanese Laid-open Patent Publication No. 2015-125510

SUMMARY

According to an aspect of the embodiments, a non-transitory computer-readable recoding medium having stored therein a connection management program that causes a computer to execute a process that includes receiving registrations of a plurality of certificates, the plurality of certificates respectively being used to establish connections to a plurality of external systems, respectively, the plurality of external systems respectively relating to a plurality of tenants, respectively, whose connections are managed by the computer, and establishing a connection to a specific external system using a specific certificate when a information processing terminal associated with a specific tenant is connecting to the specific external system, the specific certificate corresponding both to the specific tenant and the specific external system, the specific external system being included in the plurality of external systems.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a configuration of an entire system according to embodiments;

FIG. 2 illustrates an example of a connection management device according to a first embodiment;

FIG. 3 illustrates examples of tables stored in the connection management device according to the first embodiment;

FIG. 4 is a sequence chart that illustrates an example of a flow of certificate registration processing according to the first embodiment;

FIG. 5 is a sequence chart that illustrates an example of a flow of authentication processing according to the first embodiment;

FIG. 6 is a flowchart that illustrates an example of a flow of certificate referring processing according to the first embodiment;

FIG. 8 illustrates examples of tables stored in the connection management device according to the second embodiment;

FIG. 9 is a sequence chart that illustrates an example of a flow of certificate registration processing according to the second embodiment;

FIG. 10 is a sequence chart that illustrates an example of a flow of authentication processing according to the second embodiment;

FIG. 11 is a flowchart that illustrates an example of a flow of certificate referring processing according to the second embodiment.

DESCRIPTION OF EMBODIMENTS

Figure 7:
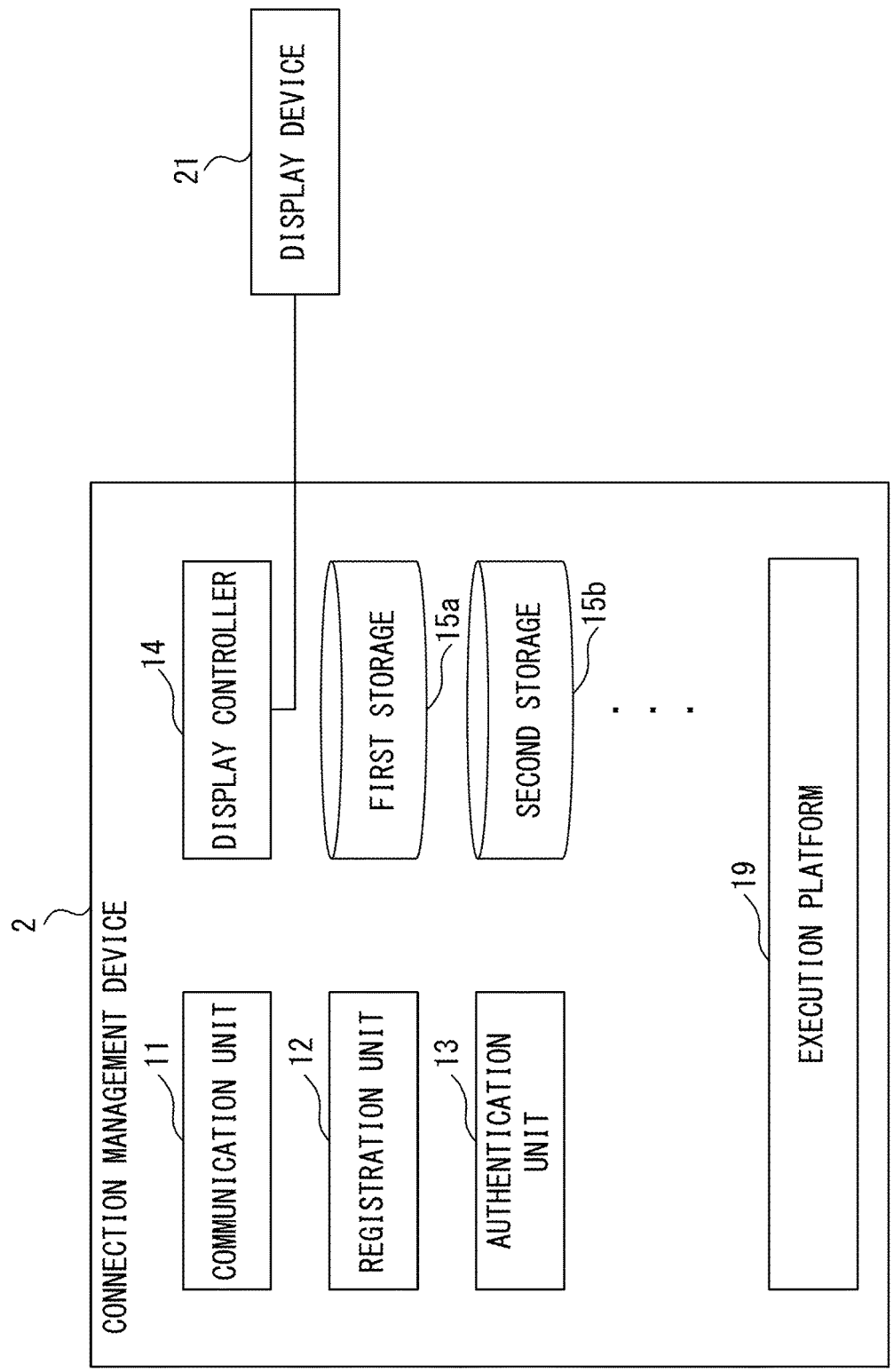
FIG. 7 illustrates an example of the connection management device according to a second embodiment.

When information processing terminals are each associated with a corresponding tenant from among a plurality of tenants and when each of the information processing terminals is connected to a back-end system (an external system) that corresponds to the corresponding tenant with which the information processing terminal is associated, these accesses to the external system are managed using different execution platforms or using a shared execution platform.

When the accesses to the external system for each tenant are managed using different execution platforms, a certificate is managed for each execution platform, so the security is increased but there is a need for extra work to manage an execution platform for each tenant. This results in being less convenient for a tenant management.

On the other hand, when each information processing terminal associated with a tenant establishes a connection, via a shared execution platform, to a back-end system (an external system) that corresponds to the tenant with which the information processing terminal is associated, the execution platform holds a certificate of the back-end system which corresponds to each of the tenants and it is possible to establish a connection between the execution platform and each back-end system, so there is a need to prevent an information processing terminal that performs an access via the execution platform from establishing a connection to the external system which corresponds to a tenant different from the tenant of the information processing terminal. In other words, there is a need to ensure the security.

<Example of Configuration of Entire System According to Embodiments>

Embodiments will now be described with reference to the drawings. FIG. 1 illustrates an example of a configuration of an entire system according to embodiments. The system according to the embodiments includes an information processing terminal 1, a connection management device 2, a first back-end system 3a, a second back-end system 3b, a first network 4, and a second network 5.

The information processing terminal 1 is an information processing terminal associated with a tenant, and can communicate with the connection management device 2 through the first network 4. The information processing terminal 1 may be a mobile terminal that can be used by the tenant, or a fixed terminal such as a personal computer. One information processing terminal 1 may be connected to the first network 4, or a plurality of information processing terminals 1 may be connected to the first network 4.

A tenant is, for example, a company that uses cloud services that use the connection management device 2. A plurality of users may belong to the tenant. The user can use the information processing terminal 1 by inputting an ID and a password of the tenant that are set in the information processing terminal 1.

The connection management device 2 receives a registration of a certificate used to establish a connection to a back-end system 3 that corresponds to a tenant, and establishes a connection to the back-end system 3 using the certificate corresponding to the tenant. The connection management device 2 includes an execution platform used for cloud services such as PaaS. The connection management device 2 is an example of a computer.

The connection management device 2 performs an authentication using a certificate, so as to allow only a tenant authorized to use a back-end system 3 to use the back-end system 3. For example, the connection management device 2 has a function as an application programming interface (API) gateway.

The first back-end system 3a and the second back-end system 3b are systems that each have an execution platform that an authenticated tenant can be used from the outside. In the following descriptions, the back-end systems 3a and 3b are both referred to as a back-end system 3 when the back-end systems 3a and 3b are not to be distinguished from each other. The number of back-end systems 3 is not limited to two, but there may be three or more back-end systems 3.

The back-end system 3 is a system that provides an execution platform for executing an application to a user who establishes a connection from the outside. The back-end system 3 is an example of an external system. The first back-end system 3a or the second back-end system 3b is an example of a specific external system.

The first network 4 and the second network 5 are, for example, Internet networks. The first network 4 and the second network 5 may be the same network.

As described above, in the system according to the embodiments, the connection management device 2 having an authentication function is arranged between the information processing terminal 1 and the back-end system 3, so the use of the services of the back-end system 3 will be restricted unless via the connection management device 2. Thus, the back-end system 3 is protected from an unauthorized intrusion.

<Example of Connection Management Device According to First Embodiment>

FIG. 2 illustrates an example of the connection management device 2 according to a first embodiment. The connection management device 2 includes a communication unit 11, a registration unit 12, an authentication unit 13, a display controller 14, a storage 15, and an execution platform 19. The connection management device 2 is connected to a display device 21. The connection management device 2 may include the display device 21.

The communication unit 11 transmits/receives a variety of information to/from the information processing terminal 1 through the first network 4. The communication unit receives, for example, a connection request from the information processing terminal 1 and transmits a response to the request to the information processing terminal 1.

The communication unit 11 transmits/receives a variety of information to/from the back-end system 3 through the second network 5. For example, the communication unit 11 receives a connection request from the back-end system 3 and transmits a response to the request to the back-end system 3.

The registration unit 12 receives registrations of certificates from the information processing terminal 1 which is associated with a corresponding tenant from among a plurality of tenants whose respective connections are managed by the connection management device 2, the certificates being used to establish a connection to the back-end system 3 which corresponds to the corresponding tenants. When the registration unit 12 has received a registration request from a tenant, the registration unit 12 verifies the tenant using an authentication token. When the verification has been successful, the registration unit 12 registers the certificates in the storage 15. When the verification has been successful, for example, the registration unit 12 associates the received certificates with a tenant ID and stores them in the storage 15. The tenant ID is an example of an identifier of a tenant.

When the information processing terminal 1 which is associated with one of the plurality of tenants establishes a connection to the back-end system 3, the authentication unit 13 establishes a connection to the back-end system 3 using a specific certificate corresponding the one of the plurality of tenants. For example, the authentication unit 13 obtains the specific certificate from the storage 15 using a tenant ID associated with an authentication token, and establishes a connection to the back-end system 3 using the obtained certificate.

The display controller 14 displays a certificate on the display device 21 in response to a request made by an administrator. For example, when a tenant ID associated with an authentication token input from the administrator is included in a certificate management table, the display controller 14 obtains the certificate associated with the tenant ID from the certificate management table, and displays the certificate on the display device 21.

The storage 15 has stored therein an authentication information management table used to manage authentication information on a tenant, a destination information management table used to manage destination information on the back-end system 3, and a certificate management table used to manage a certificate. The certificate management table includes certificate data itself. Other information may be stored in the storage 15. Each of the tables will be described in detail later.

As illustrated in FIG. 2, the storage 15 exists outside the execution platform 19. In other words, certificates and the execution platform 19 are stored independently of each other, and processes related to them are performed independently of each other. The storage 15 is configured such that a certain tenant is not allowed to obtain a certificate of any other tenant stored in the storage 15 even if the certain tenant is authenticated by the execution platform 19.

The execution platform 19 is an execution platform used for cloud services such as a PaaS. For example, the execution platform 19 realizes a layer lower than an application (such as middle wear or an operating system (OS)). For example, an application used by a tenant operates on the execution platform 19. The registration unit 12, the authentication unit 13, and the display controller 14 according to the embodiments operate on the execution platform 19.

In the embodiments, a plurality of tenants share the execution platform 19. In other words, the plurality of tenants are authorized to access and use the execution platform 19. Thus, information on each tenant is managed using each table stored in the storage 15.

FIG. 3 illustrates examples of tables stored in the connection management device. The tables illustrated in FIG. 3 are stored in the storage 15.

The authentication information management table is used to manage authentication information on a tenant that is authorized to use a cloud service provided by the connection management device 2. An authentication token, a tenant ID, and tenant information are associated with one another and recorded in the authentication information management table.

The authentication token is access information used to establish a communication connection to the connection management device 2. The authentication token is added to each tenant in advance by an administrator who manages the connection management device 2. The tenant ID is information that can identify a tenant. The tenant information is a variety of information on a tenant, and is a tenant name in the example illustrated in FIG. 3.

A tenant ID, destination information, and a uniform resource locator (URL) are associated with one another and recorded in a destination information management table. The tenant ID corresponds to the tenant ID recorded in the authentication information management table.

The destination information is information that indicates a name of the back-end system 3 used by a tenant. The URL is information that identifies a location of the back-end system 3 on a network that is included in the destination information. The destination information management table may include information that indicates a route that is used when the connection management device 2 establishes a communication connection to the back-end system 3.

The certificate management table includes a tenant ID and certificate information. The tenant ID corresponds to the tenant ID recorded in the authentication information management table and in the destination information management table. The certificate information is information that indicates a certificate that is used when a connection to each back-end system 3 is established.

<Example of Flow of Processing According to First Embodiment>

FIG. 4 is a sequence chart that illustrates an example of a flow of certificate registration processing according to the first embodiment. The information processing terminal 1 transmits, to the communication unit 11 of the connection management device 2, a registration request to which an authentication token has been added (Step S201).

For example, when a user who belongs to a tenant performs a manipulation on the information processing terminal 1 to make a request for an input of an authentication token and a registration of a certificate, the information processing terminal 1 receives the manipulation. When the information processing terminal 1 has received the manipulation, the registration request described above is transmitted from the information processing terminal 1 to the connection management device 2.

When the communication unit 11 receives the registration request to which an authentication token has been added, the registration unit 12 of the connection management device 2 verifies the tenant using the authentication token (Step S202).

In Step S202, the registration unit 12 checks whether the transmitted authentication token is included in the authentication information management table stored in advance. In other words, the registration unit 12 checks whether the tenant corresponding to the information processing terminal 1 which has transmitted the registration request is authorized to use the back-end system 3.

When the verification has been unsuccessful (NO in Step S203), the registration unit 12 transmits, to the information processing terminal 1 and through the communication unit 11, error information indicating that an access is not allowed (Step S204). For example, when the transmitted authentication token is not included in the authentication information management table and when the tenant is not authorized to use the back-end system 3, the verification will be unsuccessful.

When the verification has been successful (YES in Step S203), the registration unit 12 registers a certificate in the storage 15 (Step S205). For example, when the transmitted authentication token is included in the authentication information management table and when the tenant is authorized to use the back-end system 3, the verification will be successful.

In Step S205, the registration unit 12 newly creates a certificate corresponding to the verified tenant. Then, the registration unit 12 associates the created certificate with a tenant ID associated with the authentication token verified in Step S202, and adds them to the certificate management table.

As described above, a tenant ID added for each tenant and a certificate are associated with each other and stored, so it is possible to prevent a certain tenant from accessing a back-end system that corresponds to another tenant, using a certificate that corresponds to the another tenant.

For example, it is assumed that a certificate is managed by an execution platform in a cloud service such as a PaaS. In this case, a plurality of certificates are managed in a state in which each of the plurality of certificates is not associated with a tenant. For example, if an API and a certificate are managed in a state in which they are associated with each other and if the API and the certificate are erroneously associated, a connection to a back-end system managed by a different tenant will be established. In this case, it is difficult to ensure the security.

On the other hand, the connection management device according to the embodiments stores certificates in the storage 15 independently of the execution platform 19, so it is possible to improve the security even if a plurality of tenants share the execution platform 19 as in the system according to the embodiments.

Further, in the system according to the embodiments, a plurality of tenants share the execution platform 19, so there is no need to provide the execution platform 19 for each tenant. This results in improving the convenience and in reducing costs.

FIG. 5 is a sequence chart that illustrates an example of a flow of authentication processing according to the first embodiment. The processing illustrated in FIG. 5 is performed when a tenant uses the service of the back-end system 3. The information processing terminal 1 transmits, to the communication unit 11 of the connection management device 2, a connection request to which an authentication token has been added (Step S301).

For example, when a user who belongs to a tenant performs a manipulation on the information processing terminal 1 to make a request for an input of an authentication token and an establishment of a connection to the back-end system 3, the information processing terminal 1 receives the manipulation. When the information processing terminal 1 has received the manipulation, the connection request described above is transmitted from the information processing terminal 1 to the connection management device 2.

When the authentication unit 13 of the connection management device 2 has received, through the communication unit 11, the connection request to which an authentication token has been added, the authentication unit 13 verifies the tenant using the authentication token (Step S302). In Step S302, the authentication unit 13 checks whether the received authentication token is included in the authentication information management table. In other words, the authentication unit 13 checks whether the tenant corresponding to the information processing terminal 1 which has transmitted the connection request is authorized to use the back-end system 3.

When the verification has been unsuccessful (NO in Step S303), the authentication unit 13 transmits, to the information processing terminal 1 and through the communication unit 11, error information indicating that an access is not allowed (Step S304). For example, when the transmitted authentication token is not included in the authentication information management table and when the tenant is not authorized to use the back-end system 3, the verification will be unsuccessful.

When the verification has been successful (YES in Step S303), the authentication unit 13 makes a request for the storage 15 to add a certificate (Step S305). For example, when the transmitted authentication token is included in the authentication information management table and when the tenant is authorized to use the back-end system 3, the verification will be successful.

In Step S305, the authentication unit 13 refers to the authentication information management table to check a tenant ID associated with the authentication token, and makes a request for the storage 15 to add a certificate using the tenant ID.

When the tenant ID associated with the authentication token is included in the certificate management table, the authentication unit 13 obtains a certificate associated with the tenant ID from the storage 15 (Step S306).

As in the process of Step S306, the authentication unit 13 obtains a certificate associated with a tenant ID of an authenticated tenant, so it is not possible for a certain tenant to obtain a certificate associated with another tenant (tenant ID).

After the authentication unit 13 obtains the certificate in Step S306, the authentication unit 13 refers to the destination information management table to check a destination (such as an URL) associated with the tenant ID corresponding to the certificate (Step S307).

The authentication unit 13 transmits, to the destination checked in Step S307 and through the communication unit 11, the request to which the certificate obtained in Step S306 has been added (Step S308).

The back-end system 3 checks whether the certificate added to the received request is valid. The back-end system 3 checks whether the certificate added to the received request is valid by checking the certificate added to the received request against certificate information stored in advance.

When it has been confirmed that the certificate is valid, the back-end system 3 transmits, to the communication unit 11 of the connection management device 2, a response indicating that the connection is to be allowed (Step S309).

The authentication unit 13 has received the response from the back-end system 3, the authentication unit 13 transmits, to the information processing terminal 1 and through the communication unit 11, the response indicating that the connection is to be allowed (Step S310).

According to the processing described above, the information processing terminal 1 which is associated with a verified tenant can establish a connection to the back-end system 3 using a certificate, and use the service of the back-end system 3.

In the connection management device 2 according to the embodiments, certificates are managed independently for each tenant, so only a tenant verified by an authentication token can use a certificate corresponding to the verified tenant. The connection management device 2 makes it possible to ensure the security without providing the execution platform 19 for each tenant because a connection to the back-end system 3 is established using a certificate corresponding to a tenant.

Thus, the connection management device 2 makes it possible to improve the convenience due to there being no need to provide the execution platform 19 for each tenant and to ensure the security at the same time.

When the execution platform 19 is authenticated by the back-end system 3 and when the execution platform 19 is shared by a plurality of tenants, the plurality of tenants can be connected to the execution platform 19. However, the storage 15 that has stored therein the certificate management table is independent of the execution platform 19, so for example, it is difficult for a malicious intruder to establish a connection to the back-end system 3 which is not provided to the malicious intruder itself. In other words, it is possible to further improve the security for the storage 15 due to the storage 15 being independent of the execution platform 19.

FIG. 6 is a flowchart that illustrates an example of a flow of certificate referring processing according to the first embodiment. The processing illustrated in FIG. 6 is performed when the administrator of the connection management device 2 refers to a certificate. For example, the administrator refers to a certificate in order to check a content of a registration of the certificate after the registration.

The authentication unit 13 of the connection management device 2 receives an input of an authentication token from the administrator (Step S401). The authentication token used in Step S401 may be, for example, an authentication token provided for the administrator.

When the connection management device 2 has received the input of the authentication token from the administrator, the authentication unit 13 of the connection management device 2 verifies whether the authentication token is valid (Step S402). In Step S401, the authentication unit 13 checks whether the input authentication token is included in the authentication information management table stored in advance.

When the verification has been unsuccessful (NO in Step S403), that is, when the input authentication token is not included in the authentication information management table, the authentication unit 13 displays, on the display device 21, error information indicating that an access is not allowed (Step S404).

When the verification has been successful (YES in Step S403), that is, when the input authentication token is included in the authentication information management table, the authentication unit 13 makes a request for the storage 15 to add a certificate (Step S405). In Step S405, the authentication unit 13 makes a request for the storage 15 to add a certificate using a tenant ID associated with the authentication token.

When the tenant ID associated with the authentication token is included in the certificate management table, the authentication unit 13 obtains a certificate associated with the tenant ID from the storage 15 (Step S406).

The display controller 14 displays information indicating the certificate obtained in Step S406 on the display device 21 (Step S407).

According to the processing describe above, the administrator can check a content of a certificate corresponding to each tenant by referring to the certificate using an authentication token.

The example of displaying one certificate on the display device 21 using an authentication token has been described, but the connection management device 2 may display, on the display device 21, the certificate management table including a plurality of pieces of certificate information using an authentication token provided for the administrator.

<Example of Connection Management Device According to Second Embodiment>

FIG. 7 illustrates an example of the connection management device according to a second embodiment. The connection management device 2 includes the communication unit 11, the registration unit 12, the authentication unit 13, the display controller 14, a storage 15a, a storage 15b, and the execution platform 19. The storage 15a and the storage 15b may be respectively provided in regions logically different from each other. Alternatively, the storage 15a and the storage 15b may be respectively provided in devices physically different from each other. The storage 15a and the storage 15b are hereinafter collectively referred to as the storage 15.

The connection management device 2 is connected to the display device 21. The connection management device 2 may include the display device 21. In the example illustrated in FIG. 7, the connection management device 2 includes two storages 15, but it may include three or more storages 15.

The connection management device 2 according to the second embodiment is different from the connection management device 2 according to the first embodiment in that it includes a plurality of storages 15.

The connection management device 2 according to the second embodiment includes a corresponding storage 15 for each tenant (for each certificate). In other words, one storage 15 stores one certificate and information corresponding to the one certificate (such as a tenant ID).

FIG. 8 illustrates examples of tables stored in the connection management device according to the second embodiment. The tables of the second embodiment are different from the tables of the first embodiment in that information that identifies the storage 15 which stores a certificate is recorded in the authentication information management table. Further, the tables of the second embodiment are different from the tables of the first embodiment in that there exists no certification management table in the second embodiment because a certificate is stored in each storage 15. An authentication token, a tenant ID, tenant information, and information that identifies the storage 15 which stores a certificate are associated with one another and recorded in the authentication information management table of the second embodiment.

A plurality of users belong to a tenant, and a certificate is used when each user is connected to the back-end system 3. As described above, the connection management device 2 of the second embodiment includes a corresponding storage 15 for each tenant (for each certificate), so it is possible to quickly perform the processing of referring to a certificate.

Further, the storages 15 are independent of one another, so when there is an increase in the use of a certain storage by a specific tenant, it is possible to avoid affecting the uses of other storages 15 by other tenants (such as a reduction in processing speed).

A certificate and information corresponding to the certificate (such as a tenant ID) may be stored in a storage included in a back-end system 3 that corresponds to the certificate. In this case, a tenant that uses the back-end system 3 can manage the certificate by itself.

<Example of Flow of Processing According to Second Embodiment>

A flow of processing according to the second embodiment is described below, focusing on the difference from the first embodiment.

FIG. 9 is a sequence chart that illustrates an example of a flow of certificate registration processing according to the second embodiment. In the second embodiment, the process of Step S205' is performed instead of the process of Step S205 of the first embodiment.

Upon registering a certificate, the registration unit registers the certificate in the storage 15 which is different from the storage 15 which is already used as a storage region for a certificate of another tenant (Step S205'). Further, the registration unit 12 associates information that identifies the storage 15 in which the certificate has been registered with a tenant ID and records them in the authentication information management table.

According to the processing described above, one certificate and information corresponding to the one certificate (such as a tenant ID) are stored in one storage 15 without different certificates being registered in one storage 15.

FIG. 10 is a sequence chart that illustrates an example of a flow of authentication processing according to the second embodiment. In the second embodiment, the process of Step S305' is performed instead of the process of Step S305 of the first embodiment.

The authentication unit 13 identifies the storage 15 in which a certificate to be obtained is to be stored, and makes a request to the identified storage 15 for a certificate (Step S305'). For example, the authentication unit 13 refers to the authentication information management table and makes a request for a certificate to the storage 15 associated with the tenant ID verified in Step S302.

As described above, in the second embodiment, a request for a certificate is made to a specific storage 15 in which other certificate information has not been stored, so it is possible to perform the processing of obtaining a certificate more quickly.

FIG. 11 is a flowchart that illustrates an example of a flow of certificate referring processing according to the second embodiment. In the second embodiment, the process of Step S405' is performed instead of the process of Step S405 of the first embodiment.

The authentication unit 13 identifies the storage 15 in which a certificate to be obtained is to be stored, and makes a request for the identified storage 15 to add a certificate (Step S405'). For example, the authentication unit 13 refers to the authentication information management table and makes a request for a certificate to the storage 15 associated with a tenant ID associated with the authentication token verified in Step S402.

As described above, in the second embodiment, a request for a certificate is made to a specific storage 15 in which other certificate information has not been stored, so it is possible to perform the processing of obtaining a certificate more quickly, which results in being able to display a certificate more quickly.

<Example of Hardware Configuration of Connection Management Device>

Figure 12:
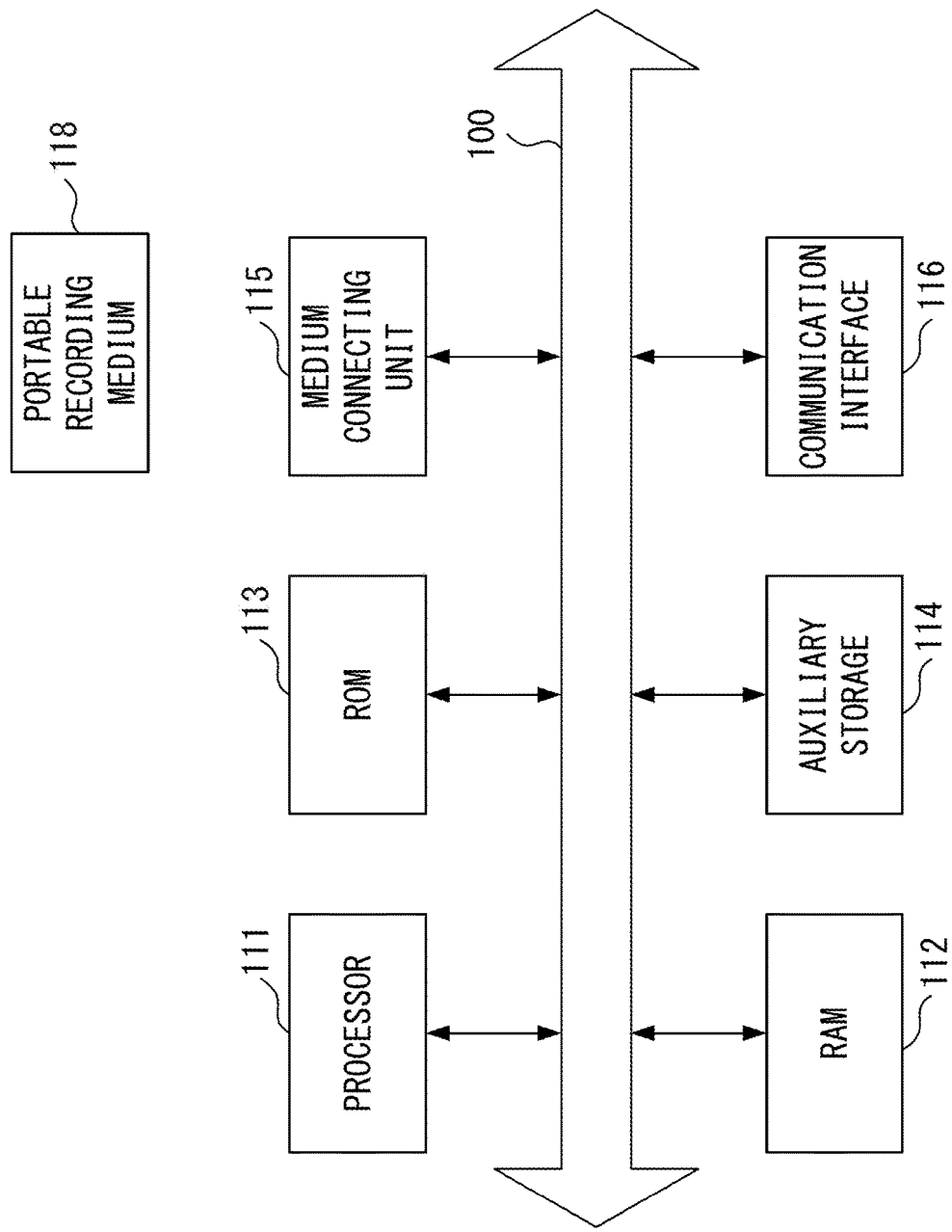
FIG. 12 illustrates a hardware configuration of the connection management device.

Next, an example of a hardware configuration of the connection management device is described with reference to the example of FIG. 12. FIG. 12 illustrates an example of a hardware configuration of the connection management device 2. As illustrated in the example of FIG. 12, a processor 111, a random access memory (RAM) 112, and a read only memory (ROM) 113 are connected to a bus 100. Further, an auxiliary storage 114, a medium connecting unit 115, and a communication interface 116 are connected to the bus 100.

The processor 111 executes a program deployed in the RAM 112. As a program to be executed, a connection management program that performs the processing according to the embodiments may be applied.

The ROM 113 is a nonvolatile storage that stores therein the program deployed in the RAM 112. The auxiliary storage 114 is a storage that stores therein various pieces of information, and, for example, a hard disk drive or a semiconductor memory may be applied as the auxiliary storage 114. The medium connecting unit 115 is provided connectively to a portable recording medium 118.

As the portable recording medium 118, a portable memory, an optical disk (such as a compact disc (CD) and a digital versatile disc (DVD)), or a semiconductor memory may be applied. The connection management program that performs the processing according to the embodiments may be recorded in the portable recording medium 118.

The storage 15 illustrated in FIG. 2 may be realized by the RAM 112 or the auxiliary storage 114. The communication unit 11 illustrated in FIG. 2 may be realized by the communication interface 116. The registration unit 12, the authentication unit 13, and the display controller 14 illustrated in FIG. 2 may be realized by the processor 111 executing the provided connection management program.

All of the RAM 112, the ROM 113, the auxiliary storage 114, and the portable storage medium 118 are examples of a computer-readable tangible storage medium. These tangible storage media are not a transitory medium such as a signal carrier.

As described above, the connection management device 2 makes it possible to improve the convenience of a tenant management and to ensure the connection security at the same time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recoding medium having stored therein a connection management program that causes a computer to execute a process comprising:
    receiving registrations of a plurality of certificates, the plurality of certificates respectively being used to establish connections to a plurality of external systems, respectively, the plurality of external systems respectively relating to a plurality of tenants, respectively, whose connections are managed by the computer; and
    establishing a connection to a specific external system using a specific certificate when a information processing terminal associated with a specific tenant is connecting to the specific external system, the specific certificate corresponding both to the specific tenant and the specific external system, the specific external system being included in the plurality of external systems.

2. The non-transitory computer-readable recoding medium according to claim 1, wherein
    when the registrations of the plurality of certificates have been received, the plurality of certificates are stored independently of an execution platform for an application, the execution platform being shared by the plurality of tenants.

3. The non-transitory computer-readable recoding medium according to claim 1, wherein
    the plurality of certificates are respectively stored in different storages.

4. The non-transitory computer-readable recoding medium according to claim 1, wherein
    one of the plurality of certificates is stored in a storage of one of the plurality of external systems that corresponds to the one of the plurality of certificates.

5. The non-transitory computer-readable recoding medium according to claim 1, wherein
    an identifier of one of the plurality of tenants and one of the plurality of certificates are associated with each other and stored when the registrations of the plurality of certificates have been received.

6. The non-transitory computer-readable recoding medium according to claim 1, wherein
    an authentication token is received from the information processing terminal associated with one of the plurality of tenants,
    the authentication token is verified so as to verify whether the one of the plurality of tenants is authorized to use the specific external system, and
    when the one of the tenants has been determined to be authorized to use the specific external system, a connection to the specific external system is established using one of the plurality of certificates which corresponds to the one of the tenants.

7. A connection management method conducted by a computer, the connection management method comprising:
    receiving registrations of a plurality of certificates, the plurality of certificates respectively being used to establish connections to a plurality of external systems, respectively, the plurality of external systems respectively relating to a plurality of tenants, respectively, whose connections are managed by the computer; and
    establishing a connection to a specific external system using a specific certificate when a information processing terminal associated with a specific tenant is connecting to the specific external system, the specific certificate corresponding both to the specific tenant and the specific external system, the specific external system being included in the plurality of external systems.

8. A connection management device comprising:
a processor configured to execute a process including:
- receiving registrations of a plurality of certificates, the plurality of certificates respectively being used to establish connections to a plurality of external systems, respectively, the plurality of external systems respectively relating to a plurality of tenants, respectively, whose connections are managed by the processor; and
- establishing a connection to a specific external system using a specific certificate when a information processing terminal associated with a specific tenant is connecting to the specific external system, the specific certificate corresponding both to the specific tenant and the specific external system, the specific external system being included in the plurality of external systems.

* * * * *